United States Patent [19]

Drews et al.

[11] 4,231,345
[45] Nov. 4, 1980

[54] APPARATUS FOR CONTROLLING AN ELECTRICAL SWITCHING ELEMENT IN INTERNAL COMBUSTION ENGINES

[75] Inventors: Ulrich Drews, Vaihingen-Pulverdingen; Hans Schnürle, Walheim; Michael Horbelt, Schwieberdingen; Bernhard Schmidt, Leonberg; Peter Werner, Wiernsheim, all of Fed. Rep. of Germany

[73] Assignee: Robert Bosch GmbH, Stuttgart, Fed. Rep. of Germany

[21] Appl. No.: 24,489

[22] Filed: Mar. 27, 1979

[30] Foreign Application Priority Data

Apr. 12, 1979 [DE] Fed. Rep. of Germany ....... 2815780

[51] Int. Cl.³ .............................................. F02M 37/08
[52] U.S. Cl. .................................. 123/510; 123/494; 123/179 B; 123/198 DB
[58] Field of Search .... 123/198 D, 198 DC, 198 DB, 123/139 E, 32 EA, 32 EJ, 179 B, 32 EG, 136; 307/141; 290/36 R; 417/10, 12

[56] References Cited

U.S. PATENT DOCUMENTS

| | | | |
|---|---|---|---|
| 2,943,614 | 7/1960 | Bosch et al. | 123/32 EA |
| 3,470,854 | 10/1969 | Eisele et al. | 123/32 EA |
| 3,680,539 | 8/1972 | Savage et al. | 123/198 DC X |
| 3,742,256 | 6/1973 | Frederiksen et al. | 123/32 EA X |
| 3,898,964 | 8/1975 | Werner et al. | 123/32 EA |
| 4,088,110 | 5/1978 | Sperline | 123/198 DB |
| 4,165,727 | 8/1979 | Fitzner et al. | 123/198 D X |

Primary Examiner—Tony M. Argenbright
Attorney, Agent, or Firm—Edwin E. Greigg

[57] ABSTRACT

This invention relates to an apparatus for controlling at least one electrical switching element in internal combustion engines, particularly the main relay of the voltage supply, in accordance with one operating characteristic and with a switch position which indicates an operating condition, in which the signal corresponding to the operating characteristic can be fed to a storage device whose charging and/or discharging process can be influenced by the switch relative to the ignition with the value of the storage signal serving to control the electrical switching element. Furthermore, the signal in accordance with the operating condition and, indirectly or directly, corresponding to the operating characteristic can be fed to a connection point whose output signal can be switched to a switching device for heating the heating wire in an air flow rate meter to a red-hot condition.

7 Claims, 3 Drawing Figures

4,231,345

APPARATUS FOR CONTROLLING AN ELECTRICAL SWITCHING ELEMENT IN INTERNAL COMBUSTION ENGINES

BACKGROUND OF THE INVENTION

There is a well-known circuit for controlling the electrical fuel pump in accordance with an rpm signal in order that, for example, in an accident and with a resultant sudden stopping of the internal combustion engine, no more fuel is supplied to the engine. In this known circuit, a capacitor is charged in accordance with an rpm signal and the value of the discharging time constant of the capacitor is kept constant. However, the specific timing condition established on the basis of certain electrical properties does not allow an optimum cut-off operation for the internal combustion engine.

OBJECT AND SUMMARY OF THE INVENTION

It is an object of the invention to provide exactly this optimum transition in the engine from the operating to the resting state. Thus, it is assured that in an emergency situation, the electrical circuitry and also the fuel supply to the engine is turned off or interrupted very rapidly and in case of a normal cut-off, a quiet running-out of the engine is assured.

The purpose of the device is to obtain in an internal combustion engine which is in transition to a state of rest at least two different time intervals dependent on the position of the ignition switch. With a switched-on ignition and an rpm below a certain value, there is obtained a rapid disconnection of the electrical system in the engine and therefore of the electrical fuel pump which supplies the fuel. Thus, maximum security can be attained, for instance in an emergency. In contrast, in a normal shut-off process in an internal combustion engine where the rpm reaches the value zero only after the ignition is turned off, a delayed cessation of the electrical processes is desirable with regard to good driving comfort and with regard to a quiet shut-off of the internal combustion engine. During this shut-off phase, it is intended that the air flow rate meter for the air throughput in the air intake tube (equipped with a heating wire, for example) will be heated red-hot in order to clean undesirable deposits off it. With the proposed device, both goals mentioned are achieved with the least technical control effort, so that the entire system can be produced cost efficiently.

It has proved especially advantageous to carry out the red-hot heating process in an air flow rate meter with a heating wire subject to the timing of the electrical storage signal as well.

The invention will be better understood as well as further objects and advantages thereof become more apparent from the ensuing detailed description of exemplary embodiments taken in conjunction with the drawings.

DESCRIPTION OF THE PREFERRED EMBODIMENT

Figure 1:
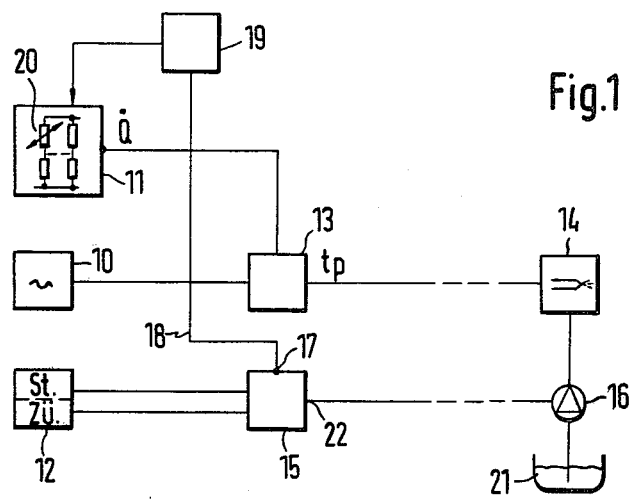
FIG. 1 shows a general block diagram of an internal combustion engine fuel control system with external ignition.

In FIG. 1 there is shown an rpm transducer 10, an air flow rate meter 11 for measuring the amount of intake air flow and a combined ignition-start switch 12. The output signals from the rpm transducer 10 and the air flow rate meter 11 are fed to a timing element 13 in which rpm signals with the pulse length tp are produced on the basis of the rpm and air quantity signals. The output of the timing element 13 is coupled to an electromagnetic injection valve 14, if necessary, across correction units which are not represented in the drawing.

The ignition-start switch 12 is connected with a device 15 for controlling, for example, the electrical fuel pump 16. From another output point 17 of the device 15, line 18 leads to a red-hot heating circuit 19 for a heating wire 20 located in the air flow rate meter 11. The fuel pump 16 conducts fuel from a tank 21 to the injection valve 14. The device 15, through its output point 22, makes the desired on and off switching of the fuel pump 16 possible. Additionally, the signal on output 17 of device 15 controls the red-hot heating circuit 19 for the heating wire 20 in the air flow rate meter 11 at that moment when the ignition-start switch 12 is in its off position and when the rpm of the engine is still above a certain value.

Figure 2:
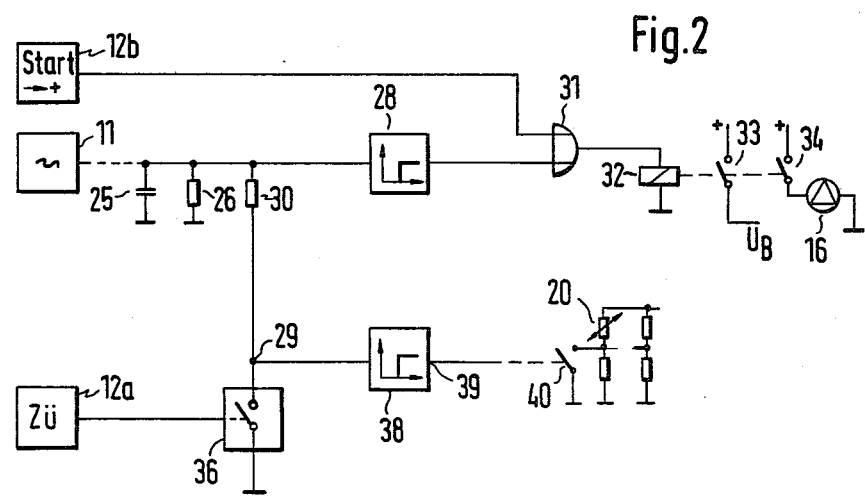
FIG. 2 is a detailed block diagram of the invention for controlling an electrical switching element.

A detailed circuit for accomplishing the operation described above with reference to FIG. 1 is shown in FIG. 2. In FIG. 2, the ignition-start switch 12 of FIG. 1 is separated into an ignition switch 12a and a start switch 12b. The rpm transducer 10 is followed, after the provision of pulse generation units, if necessary, by a parallel connected capacitor 25 and a resistor 26 connected to ground. On the rpm transducer side of the parallel connected capacitor 25 and resistor 26 there are provided a first threshold value switch 28 and a resistor 30 connected to a connection point 29. The outputs of start switch 12b and threshold value switch 28 are connected to the inputs of an OR gate 31, the output of which is connected to a relay winding 32 connected to ground. Connected across the relay winding 32 are two switches 33 and 34, which can be switched to a closed position. By means of switch 33, the battery voltage is connected to the various electrical devices of the engine, that is, of the vehicle containing the engine, and switch 34 provides the power for the fuel pump 16 and the current-regulated final stage.

A switch 36 connected between point 29 and ground can be controlled by the ignition switch 12a. If the ignition switch 12a is not turned on, this switch 36 is in the open position and it closes when the ignition switch 12a is turned on. A threshold value switch 38 is also connected to point 29 and is provided with an output 39 coupled to another switch 40. The function of switch 40 is to detune the air quantity measuring bridge of air flow rate meter 11 in such a way that the temperature causing the red-hot state is generated in the heating wire 20.

No input signals are fed to the input of the OR gate 31 if the engine is turned off and the ignition-start switch 12 is turned off. Therefore, the relay winding 32 is not energized and the switches 33 and 34 are in the open position. This means also that no voltage is supplied to the electrical devices and also that the fuel pump 16 does not supply fuel. In addition, the threshold value switch 38 does not provide a signal. The bridge circuit with the heating wire 20 therefore can function properly as soon as it receives a voltage signal.

If the ignition switch 12a is activated, switch 36 closes and connects the resistors 26 and 30 in parallel.

When activating the start switch 12b, the relay winding 32 receives a voltage through the OR gate 31 and the switches 33 and 34 are moved to the closed position supplying the rest of the circuit devices and also the fuel pump 16 with power. At the same time that the start switch 12b is activated, a starter (not shown in the drawings) turns on the engine and the rpm transducer 10 provides a positive signal which becomes increasingly larger. Therefore, the voltage across the capacitor 25 increases, and at a certain magnitude, the threshold value switch 28 is activated to maintain the relay winding 32 through the OR gate 31 continuously in an energized state. This also continues after the start switch 12b is being put into its initial position. This means that the threshold of the threshold value switch 28 has to be relatively low, i.e., it has to be reached with very low rpm. When the engine runs normally, the relay winding 32 is energized continuously by the output signal from the threshold value switch 28. Switch 36 is always closed and the two resistors 26 and 30 remain connected in parallel.

If the rpm of the engine decreases for any reason in such a way that the threshold value of the threshold value switch 28 is not attained, the two switches 33 and 34 open, the fuel supply for the engine is interrupted and the electrical devices are deenergized. Because of the short discharging time constant of the capacitor 25, this interruption occurs very rapidly, with a very rapid decrease in rpm, whereby the fuel supply is interrupted immediately as necessary, for example, in the case of an accident.

When the engine is turned off normally, the engine still has a high rpm at the time of opening the ignition switch 12a so that the threshold value switch 28 still produces a positive signal from its output and the two switches 33 and 34 are closed. This opening of the ignition switch 12a causes the switch 36 to open to thereby increase the discharging time constant of the capacitor 25. This time constant and the threshold value of the threshold value switch 38 are tuned to each other in such a way that the output signal from this threshold value switch 38 remains for approximately three seconds after turning off the ignition. This output signal appears only when the internal combustion engine is turned off normally, i.e., when the ignition is turned off and the rpm is decreasing accordingly, so that the output signal from the threshold value switch 38 eventually provides a normal engine cut-off process.

While this output signal lasts, the current through the heating wire 20 in the air flow rate meter 11 is increased to such an extent that the residue which has settled on it is burned off. In this way, the heating wire 20 becomes clean again and its output signal is no longer so heavily dependent on aging. Also, it is assured that with each subsequent starting of the internal combustion engine, one can expect the same functioning condition of the air flow rate meter 11.

The increase of the discharging time constant of the capacitor 25 in a normal turn-off of the engine also results in a retarded cutting off of the electrical devices as well as the fuel pump. This prolongation of the operational readiness of the individual components, however, is of no consequence since, in this case, one can assume the correct functioning of the individual units and although, for example, the fuel pump 16 continues to provide fuel for the injection valves 14, the valves 14 are unlikely now to open because of the rapid reduction in rpm.

Figure 3:
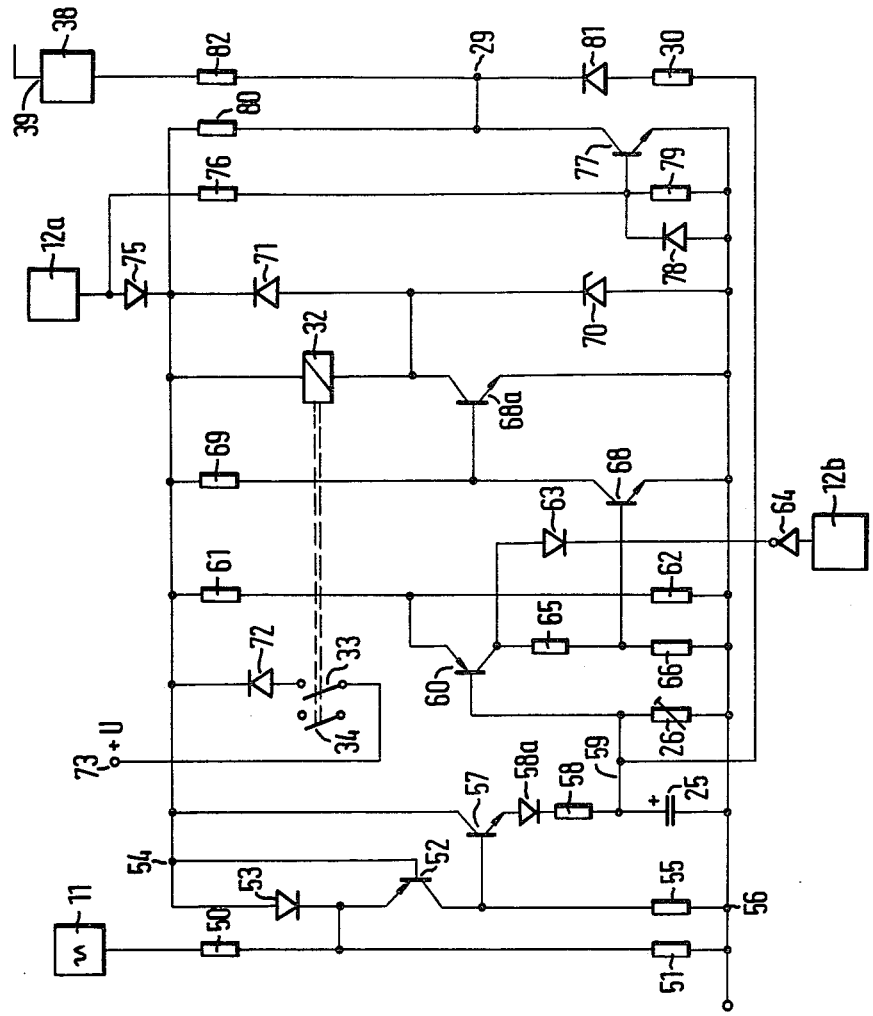
FIG. 3 is a detailed circuit diagram pertaining to the block diagram of FIG. 2.

FIG. 3 shows a detailed circuit diagram of the device of the invention shown in FIG. 2. In FIG. 3, the same reference numerals are used to identify like parts in the circuit of FIG. 2. In the circuit arrangement of FIG. 3, the rpm transducer 10 is followed by a voltage divider consisting of two resistors 50 and 51 connected to ground. The connection point of the two resistors 50 and 51 is connected to the emitter of a transistor 52 whose base is connected directly, and whose emitter is connected indirectly, through a diode 53 with the positive conductor line 54. The collector of this transistor 52 is connected to ground conductor 56 through a resistor 55 and is also connected to the base of another transistor 57. The collector of transistor 57 is connected to the positive conductor line 54 and the emitter through a resistor 58 and a diode 58a to a connection conductor line 59 by means of which the capacitor 25 and the resistor 26 are connected to the ground conductor 56. In addition, the connection conductor 59 is connected to the base of a transistor 60, whose emitter is connected to the connection point of two resistors 61 and 62 connected respectively to the positive conductor 54 and the negative conductor 56.

The collector of transistor 60 is connected, on the one hand, with the start switch 12b through a diode 63 and an inverter 64 and, on the other hand, with the ground conductor 56 across a voltage divider consisting of the resistors 65 and 66. The connection point of the two resistors 65 and 66 is connected to the base of a transistor 68 whose emitter is connected to the negative conductor 56 and whose collector is connected directly with the base of a subsequent transistor 68a and indirectly through a resistor 69 with the positive conductor 54.

The transistor 68a serves as a control for the relay winding 32 disposed between its collector and the positive conductor 54. As protection for the transistor 68, a Zener diode 70 is connected in parallel with transistor 68a and the relaxation circuit for the relay winding 32 is completed by means of a diode 71. While the switch 34 for the fuel pump control is merely indicated, the switch 33 provides the power for the device of FIG. 3 through a diode 72 from an energy source 73 which is not shown. Another diode 75 connects the ignition switch 12a to the positive conductor 54. The ignition switch 12a is also connected to the base of a transistor 77 through a resistor 76, the emitter of transistor 77 being directly connected to the negative conductor 56. Between base and emitter of transistor 77, a diode 78 and resistor 79 are provided connected in parallel as shown. The collector of transistor 77 is connected to the connection point 29 and is also connected to the positive conductor 54 through a resistor 80.

Between the connection line 59 on the side of resistor 26 and capacitor 25 remote from the ground line 56 and the connection point 29, a series connection comprising a resistor 30 and a diode 81 is provided. Subsequent to the connection point 29, through the resistor 82, is the threshold value switch 38 shown also in FIG. 2.

When the ignition switch 12a is turned on, the positive conductor 54 receives a voltage through the diode 75. At the same time, transistor 77 conducts and holds the connection point 29 at ground potential so that the threshold value switch 38 cannot function. When the start switch 12 is activated, the potential at the collector of the transistor 60 decreases so transistor 68 is nonconductive. This causes transistor 68a to conduct. As a result, current flows through the relay winding 32 and switches 33 and 34 are moved into the closed position. From this moment on, the positive conductor 54 is supplied with voltage from the working voltage source 73 through switch 33 and diode 72. The rpm signal coming from the output of the rpm transducer 10 causes the transistor 57 to conduct with an increase of the potential on connection conductor 59. As a result, the transistor 60 is shut off at a certain voltage level through capacitor 25 and holds its collector potential at a low value even when the start switch 12b has returned to its position of rest.

Because of the conduction of transistor 77, the two resistors 30 and 26 are directly connected in parallel to the capacitor 25 and therefore provide a small discharging time constant. This causes a rapid switching off of switches 33 and 34 when the rpm drops below a certain level when the ignition switch 12a is on.

In a normal turning off of the internal combustion engine, the ignition switch 12a is turned off and only thereafter does the rpm decrease. Because of the turning off of the ignition switch 12a, the transistor 77 does not conduct and substantially the same voltage of the connection conductor 54 is present at the connection point 29. As a result, the subsequent threshold value switch 38 outputs a negative signal at its output 39 for heating of the heating wire 20 in the air flow rate meter 11 to the red-hot state. The duration of this heating signal depends on the discharging time constant of the capacitor 25, whereby this discharging time constant now is dependent only on the resistor 26 and the capacitance of the capacitor 25.

The main advantage of the present circuit arrangement is to design the energization of the relay winding and the determination of the heating time of the heating wire 20 in an optimal manner with respect to both function and cost effectiveness. At the same time, a maximum of operational reliability is achieved.

The foregoing relates to a preferred embodiment of the invention, it being understood that other embodiments and variants thereof are possible within the spirit and scope of the invention, the latter being defined by the appended claims.

What is claimed and desired to be secured by Letters Patent of the United States is:

1. In an internal combustion engine having a fuel supply system, the combination of apparatus for controlling at least one electrical switching unit such as the main relay of the voltage supply and of the fuel pump control circuit in accordance with one operational characteristic and with a position of a switch such as an ignition switch indicating an operating condition, comprising a storage device for receiving a value of a signal related to a charging and discharging process, means for feeding a signal depending on one engine operational characteristic to said storage device, means for modifying at least one of the charging and discharging process determined by the switch position of the ignition switch for the engine, and means for utilizing the value of the signal stored in said storage device for controlling said electrical switching unit.

2. Apparatus according to claim 1, including at least a capacitor whose discharging time constant is dependent on the position of the ignition switch, at least one threshold value switch disposed between said capacitor and said electrical switching unit, means for applying an rpm signal to said capacitor and wherein said at least one threshold value switch is located between said capacitor and said electrical switching unit.

3. Apparatus according to claim 2 wherein the discharging time constant of said storage device is shorter when the ignition switch is turned on than when it is turned off.

4. Apparatus according to claim 2 including a start switch and an OR gate having inputs connected to said threshold value switch and said start switch.

5. Apparatus according to claim 4 including a device for controlling a switching device depending on at least one operational characteristic and a switch position indicating an operating condition including a connection unit, a switching device, an air flow rate meter having a heating unit, means for providing a signal depending on an engine operating condition, means for providing a signal depending at least indirectly on the engine operational characteristics, means for conducting said signals to said connection unit to provide an output signal, and means for switching said connection unit output to said switching device for heating said heating unit of said air flow rate meter to the red-hot state.

6. Apparatus according to claim 5 wherein said means for providing a signal depending on the engine operational characteristics include an rpm transducer and means for sending the signal from said rpm transducer at least indirectly to said switching device in accordance with the position of said ignition switch for the purpose of heating the heating unit in said air flow rate meter to the red-hot state.

7. Apparatus according to claim 6, including a series connected resistor and switch connected in parallel with said storage device and wherein the signal across said switch serves as an input signal for said switching device for the purpose of heating the heating unit in said air flow rate meter to the red-hot state through said threshold value switch.

* * * * *